United States Patent

Young et al.

Patent Number: 6,164,598
Date of Patent: Dec. 26, 2000

[54] ADAPTIVE CONTROL SURFACE APPARATUS

[75] Inventors: Kendall G. Young, Coppell; Phil S. Zimmerman, Grand Prairie, both of Tex.

[73] Assignee: Northrop Grumman Corporation, Los Angeles, Calif.

[21] Appl. No.: 09/265,671

[22] Filed: Mar. 10, 1999

[51] Int. Cl.[7] .................................................. B64C 3/50
[52] U.S. Cl. ..................... 244/212; 244/75 R; 244/211; 244/215; 244/213
[58] Field of Search ................. 244/75 R, 219, 244/211, 212, 215, 213, 214

[56] References Cited

U.S. PATENT DOCUMENTS

| | | |
|---|---|---|
| 1,710,672 | 4/1929 | Bonney . |
| 1,823,069 | 9/1931 | Stroop . |
| 3,153,523 | 10/1964 | Lowman, III ............................ 244/46 |
| 3,716,209 | 2/1973 | Pierce ..................................... 244/123 |
| 4,429,844 | 2/1984 | Brown et al. ............................ 244/219 |
| 4,863,117 | 9/1989 | Riout . |
| 4,994,660 | 2/1991 | Hauer ................................ 230/265.41 |
| 5,000,399 | 3/1991 | Readnour et al. ........................ 244/53 |
| 5,114,104 | 5/1992 | Cincotta et al. . |
| 5,222,699 | 6/1993 | Albach et al. .......................... 244/213 |
| 5,226,618 | 7/1993 | Greenhalgh ............................ 244/213 |
| 5,518,210 | 5/1996 | Friberg .................................... 244/215 |
| 5,971,328 | 10/1999 | Kota . |
| 6,010,098 | 1/2000 | Campanile et al. . |

FOREIGN PATENT DOCUMENTS

| | | | |
|---|---|---|---|
| 381962 | 10/1932 | United Kingdom ................... 244/212 |

*Primary Examiner*—Peter M. Poon
*Assistant Examiner*—Tien Dinh
*Attorney, Agent, or Firm*—Terry J. Anderson; Karl J. Hoch, Jr.

[57] ABSTRACT

In accordance with the present invention, there is provided an aerodynamic control surface apparatus for use with a wing assembly having a wing trailing edge. The control surface apparatus has an inboard section defined by a cordwise inboard side, a first trailing edge side, and a first tapering edge side disposed between the inboard and the fist trailing edge sides. The inboard section has an axis of rotation generally about the cordwise inboard side. The control surface apparatus further has an outboard section defined by a cordwise outboard side, a second trailing edge side, and a second tapering edge side disposed between the outboard and the second trailing edge sides. The outboard section has an axis of rotation generally about the cordwise outboard side. The control surface apparatus further has at least one adjustable spanwise member rotatably attached to the first and second tapering edge sides of the inboard and outboard sections. The spanwise member is movable relative to the wing assembly in response to rotation of the inboard and outboard sections.

19 Claims, 6 Drawing Sheets

ADAPTIVE CONTROL SURFACE APPARATUS

FIELD OF THE INVENTION

The present invention relates generally to an aircraft control device, and more particularly to a control surface apparatus which is actuated via rotational movement which is generally cordwise to an associated wing.

BACKGROUND OF THE INVENTION

The typical aircraft wing assembly design includes leading and trailing edges with aerodynamic lifting surfaces disposed therebetween and at least one control surface device integrated into the trailing edge. Flaps and ailerons are common examples of such control surface devices. Flaps disposed opposing wings are designed to increase wing lift by operating in unison for increasing wing camber. By comparison, ailerons are designed for roll control and are oppositely pivoted on opposing wings to increase lift on one wing while reducing lift on the opposing wing to induce a rolling moment. Similarly, elevator sections are disposed about the horizontal tail and are pivoted for lift and pitch control. Other control surface devices include leading edge flaps, elevons, trim tabs, tail fins and rudders.

These conventional control surface devices are actuated by the application of torque about an axis which is parallel to the trailing edge of the device. As such, the torque or power requirement of such devices is directly proportional to impinging air loads as the control surface is rotated into an oncoming airflow. Thus, the greater the desired control surface deflection, the greater the torque required to cause and maintain such deflection.

In addition, these conventional control surface devices are generally rigid structures which maintain their shape while being deflected or rotated about an axis which is generally parallel to the wing trailing edge. As such, gaps or abrupt contour changes occur at the lateral hinge line area of these conventional control surface devices. This gap tends to increase aerodynamic drag thereat, and therefore decreases the efficiency of the control surface device. Additionally, as the control surface devices are rotated, cordwise gaps are formed between the edges of the hinged control surface devices and the adjacent fixed portions of wing assembly.

As such, based upon the foregoing, there exists a need in the art for an improved control surface apparatus.

SUMMARY OF THE INVENTION

In accordance with the present invention, there is provided an aerodynamic control surface apparatus for use with a wing assembly having a wing trailing edge. The control surface apparatus has an inboard section defined by a cordwise inboard side, a first trailing edge side, and a first tapering edge side disposed between the inboard and the first trailing edge sides. As such, the inboard section is preferably triangular shaped. The inboard section has an axis of rotation generally about the cordwise inboard side. The cordwise inboard side of the inboard section may be hingedly attached to the wing assembly to facilitate rotation of the inboard section about the axis of rotation.

The control surface apparatus further has an outboard section defined by a cordwise outboard side, a second trailing edge side, and a second tapering edge side disposed between the outboard and the second trailing edge sides. As such, the outboard section is preferably triangular shaped. The outboard section has an axis of rotation generally about the cordwise outboard side. The cordwise outboard side of the outboard section may be hingedly attached to the wing assembly to facilitate rotation of the outboard section about the axis of rotation.

The control surface apparatus further has at least one adjustable spanwise member hingedly attached to the first and second tapering edge sides of the inboard and outboard sections. The spanwise member is movable relative to the wing assembly in response to rotation of the inboard and outboard sections. Preferably, there are provided multiple spanwise members which are configured substantially parallel to the wing trailing edge.

In the preferred embodiment of the present invention, the control surface apparatus is further provided with an inboard actuator device which is in mechanical communication with the inboard section and the wing assembly for rotation of the inboard section relative to the wing assembly. In addition, an outboard actuator device is provided which is in mechanical communication with the outboard section and the wing assembly for rotation of the outboard section relative to the wing assembly.

The control surface apparatus is preferably provided with a flexible wedge section. The wedge section has upper and lower control surfaces which taper to a wedge trailing edge portion which is disposed adjacent the wing trailing edge. The adjustable spanwise member is disposed between the upper and lower control surfaces and is in mechanical communication therewith for deflecting the upper and lower control surfaces in response to movement of the spanwise member.

The control surface apparatus is preferably provided with a flexible exterior covering which is disposed about the flexible wedge section. The exterior covering has upper and lower portions tapering to a covering trailing edge portion. The upper and lower portions are respectively disposed adjacent the upper and lower control surfaces of the flexible wedge section and the covering trailing edge portion is disposed adjacent the wedge trailing edge portion. In this respect, the exterior covering deflects and deforms in a conformal manner with deflections of the wedge section. The exterior covering sealably attaches to the wing assembly, and therefore encloses the other sub-components of the control surface apparatus which are interior to the wing assembly.

The control surface apparatus constructed in accordance with the present invention presents numerous advantages not found in the related prior art. In this respect, the present invention is particularly adapted to provide not only pitch control, like a conventional flap-type control surface, but also yaw and roll control, all of which in an aerodynamic efficient manner. In operation, the control surface apparatus of the present invention is actuated in response to the rotational movement of the inboard and outboard sections. The control surface apparatus is deflected in an upward or downward position by rotating the inboard and outboard sections in opposing rotational directions. Such opposing rotational movement causes the spanwise members to translate in an upwardly or downwardly direction relative to the wing assembly. As such, the wedge trailing edge portion deflects in a similar upwardly or downwardly direction. In this limited respect, the control surface apparatus of the present invention may provide pitch control to an associated aircraft in a like fashion as that of a conventional flap-type control surface.

Importantly, the inboard and outboard sections may be rotated in a similar rotational direction. The inboard and outboard sections may also be rotated by a differential amount of rotational movement. Such rotational movement rotates the spanwise members in a plane generally orthogonal to the cordwise inboard and outboard sides of the inboard and outboard sections. As such, the wedge trailing edge portion rotates in a similar manner. As a result, the upper and lower control surfaces of the wedge section deform and deflect along a complex three-dimensional curvature in a twisting manner. As one of ordinary skill in the art can appreciate, such complex curvature of the upper and lower control surfaces may advantageously facilitate roll and yaw control of the associated aircraft. Thus, the control surface apparatus of the present invention facilitates multi-axis adaptive control.

Significantly, actuation of the control surface apparatus of the present invention is effectuated by the application of torque to the inboard and outboard sections generally perpendicular to the spanwise or lateral axis of the wing assembly. As further discussed below, such a configuration is particularly advantageous because the power or torque requirement of the control surface apparatus is different than that of conventional prior art control surface devices.

In general, as the deflection of a control surface is increased, there is a corresponding increase in control surface area which is projected upon a fuselage station plane or that plane which is generally orthogonal to the direction of flight. As one of ordinary skill in the art can appreciate, as such projected control surface area is increased, there is a corresponding increase in the induced air load against the control surface.

A conventional trailing edge control surface is configured to rotate about a spanwise or lateral axis with respect to the wing or trailing edge thereof. The torque or power requirement to actuate such a conventional control surface is roughly proportional to the air load against the control surface. In this respect, the torque or power requirement to actuate and maintain such a conventional control surface in a slightly deflected position is minimal, because the projected surface area and therefore the air load thereon is minimal. Further, where the control surface is in a maximum deflection position (i.e., flap fully up or flap fully down), the control surface is at its maximum torque or power actuation requirement.

As mentioned above, actuation of the control surface apparatus of the present invention is effectuated by the application of torque to the inboard and outboard sections generally perpendicular to the spanwise or lateral axis of the wing assembly. Thus, the rotational axes of the inboard and outboard sections are generally perpendicular to the rotational axis of an above-described conventional control surface device. As a consequence of such a configuration, unlike a conventional control surface device, the torque or power requirement to actuate the control surface apparatus of the present invention is not directly proportional to the air loads impinging thereon. This is because where control surface apparatus is in a fully deflected position with the inboard and outboard sections rotated approximately 90° to the wing trailing edge, the actuators are at a maximal mechanical advantage with respect to the impinging air loads. As such, the air load component of the torque required to cause and maintain such deflection is minimal. The torque required to cause and maintain such deflection is primarily associated with deformation resistance forces of the flexible wedge section and flexible exterior covering. As such, the present control surface apparatus has a generally reduced actuation torque requirement in comparison to a conventional control surface for comparable air load conditions.

Another advantage of the control surface apparatus of the present invention is that it facilitates increased aerodynamic lift. As one of ordinary skill in the art will appreciate, lift is a function of wing cord length or the plan view width of the wing. Upon rotation/deflection of a conventional control surface device, the cord length is undesirably reduced. Such cord length reduction does not occur with the control surface apparatus of the present invention because of the inboard and outboard sections rotate about axes of rotation generally parallel to a cordwise direction. As such, the present invention facilitates increased aerodynamic lift in comparison to conventional prior art devices.

In addition, the exterior covering which is sealably attached to the wing apparatus advantageously mitigates the aerodynamic penalties due to leakage at control surface hinge line gaps, and gaps between the control surface edges and fixed structure, which are typically associated with some prior art control surface devices.

As such, the present invention represents an advance in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
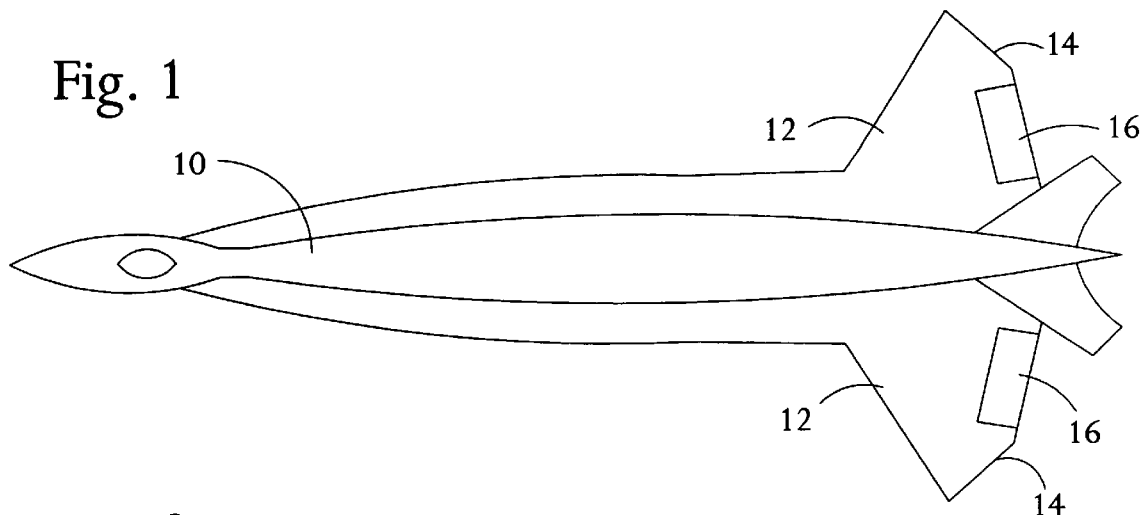
FIG. 1 is a top view of a representative aircraft as shown with the control surface apparatus of the present invention.

Referring now to the drawings wherein the showings are for purposes of illustrating a preferred embodiment of the present invention only, and not for purposes of limiting the same, FIGS. 1–15 illustrate the aircraft aerodynamic control surface apparatus of the present invention.

Figure 2:
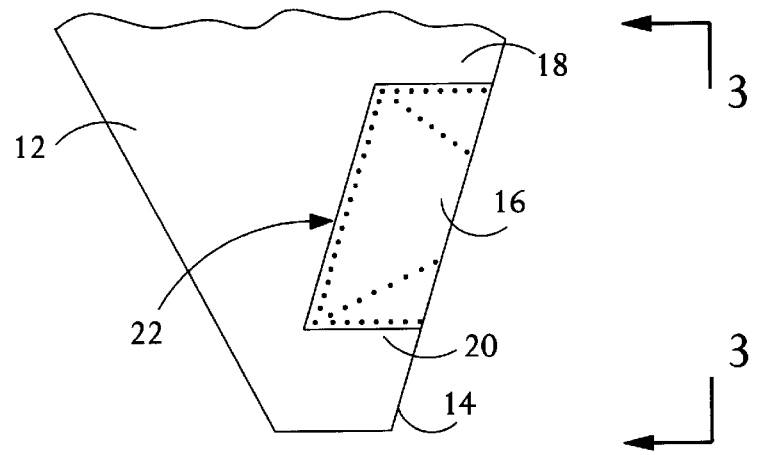
FIG. 2 is an enlarged top view of a wing and integrated control surface apparatus of the aircraft of FIG. 1.
Figure 3:
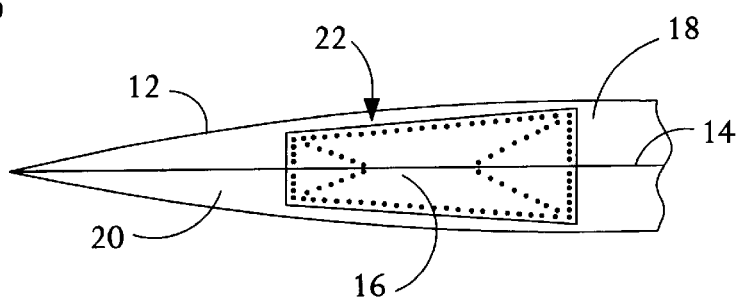
FIG. 3 is an enlarged rear view of the wing and integrated control surface apparatus of the aircraft of FIG. 2 as seen along axis 3—3.
Figure 4:
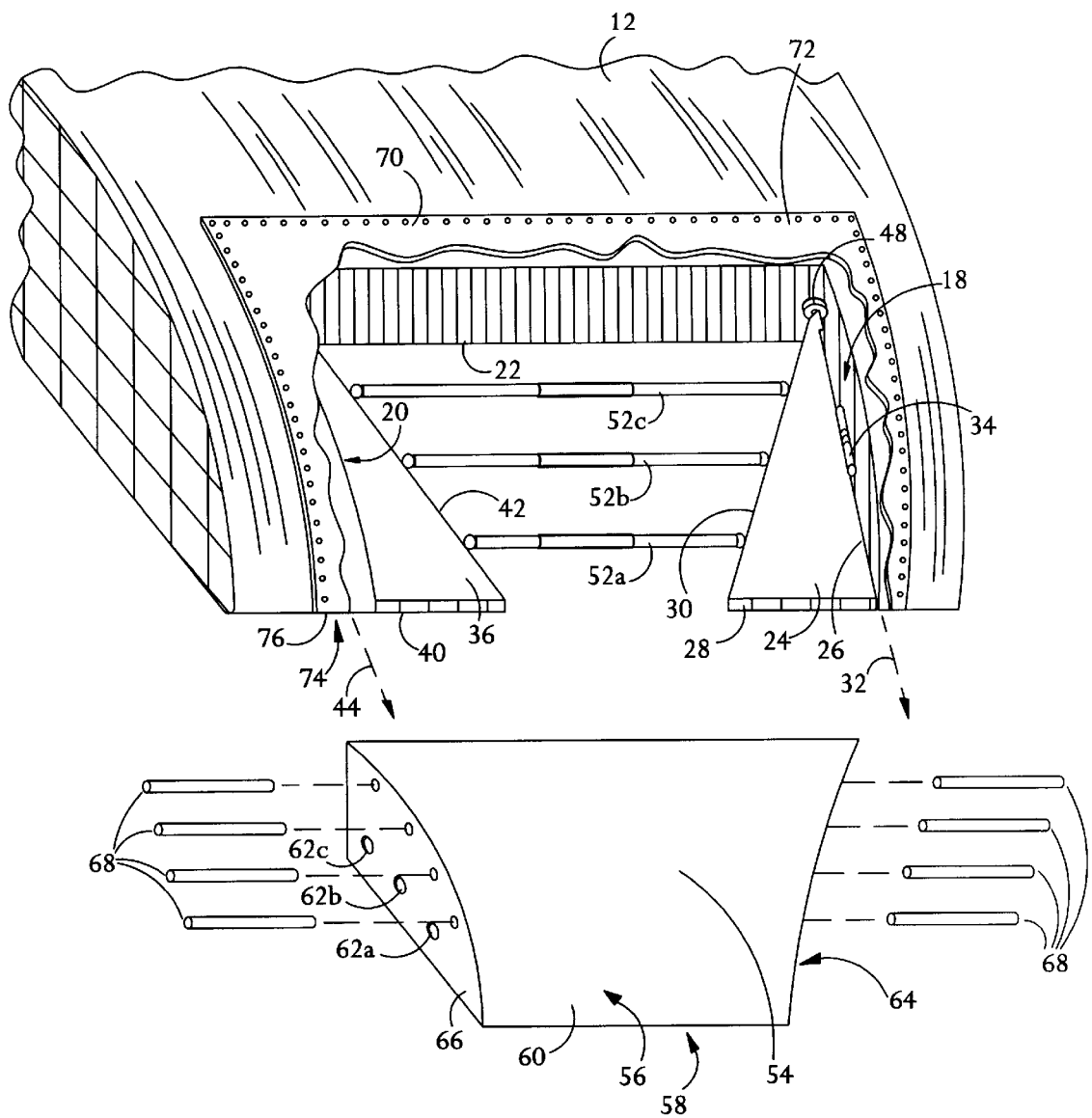
FIG. 4 is an exploded perspective view of the control surface apparatus of the present invention.

Referring now to FIG. 1, there is depicted a representative aircraft 10 having opposing wings 12. The wings/wing assemblies 12 are provided with wing trailing edges 14. An adaptive control surface apparatus 16 is integrally disposed at each of the wing trailing edges 14. Referring now to FIGS. 2–4, there are depicted enlarged views of the wing 12. The control surface apparatus 16 is disposed adjacent inboard, outboard and forward attachment portions 18, 20, 22 of the wing 12.

Referring now to FIG. 4, there is depicted an exploded perspective view of the control surface apparatus 16 of the present invention. The control surface apparatus 16 has an inboard section 24 which is defined by a cordwise inboard side 26, a first trailing edge side 28, and a first tapering edge side 30. The first tapering edge side 30 is disposed between the inboard and the first trailing edge sides 26, 28. As such, the inboard section 24 is preferably triangular shaped with the first tapering edge side 30 forming the hypotenuse of such triangular shape.

In the preferred embodiment if the present invention, the inboard section 24 is generally planar. As depicted in FIG. 4, the inboard section 24 has a normal or undeflected position, wherein the first trailing edge side 28 is generally aligned with the wing trailing edge 14 with the planar inboard section 24 being disposed generally in the plane of the wing 12. The inboard section 24 further has a deflected position, wherein the inboard section 24 is rotated from its normal position. In this respect, the inboard section 24 has an axis of rotation 32 which is generally about the cordwise inboard side 26. Such rotation may be facilitated by those attachment fixtures which are well known to one of ordinary skill in the art and the cordwise inboard side 26 of the inboard section 24 may be hingedly attached to the wing 12 at the inboard attachment portion 18 via a first hinge 34.

The control surface apparatus 16 further has an outboard section 36 which is generally sized and configured like the inboard section 24. In this respect, the outboard section 36 is defined by a cordwise outboard side 38, a second trailing edge side 40, and a second tapering edge side 42. The second tapering edge side 42 is disposed between the outboard and the second trailing edge sides 38, 40. As such, the outboard section 36 is preferably triangular shaped with the second tapering edge side 42 forming the hypotenuse of such triangular shape.

The inboard and outboard sections 24, 36 are configured such that the first and second trailing edge sides 28, 40 are interposed between the cordwise inboard and outboard sides 26, 38. In the preferred embodiment, the outboard section 36 is generally planar. As depicted in FIG. 4, the outboard section 36 has a normal or undeflected position, wherein the second trailing edge side 40 is generally aligned with the wing trailing edge 14 with the planar outboard section 36 being disposed generally in the plane of the wing 12. The outboard section 36 further has a deflected position, wherein the outboard section 36 is rotated from its normal position. In this respect, the outboard section 36 has an axis of rotation 44 which is generally about the cordwise outboard side 38. Such rotation may be facilitated by those attachment fixtures which are well known to one of ordinary skill in the art and the cordwise outboard side 38 of the outboard section 36 may be hingedly attached to the wing 12 at the outboard attachment portion 20 via a second hinge 46.

The inboard and outboard sections 24, 36 are substantially rigid structures which maintain their shape during expected operating conditions and loadings and are preferably formed of a graphite composite material. Other suitable material selections are contemplated to be chosen from those which are well known to one of ordinary skill in the art.

In the preferred embodiment of the present invention, movement/rotation of the inboard and outboard sections 24, 36 is accomplished via the respective provision of inboard and outboard actuator devices 48, 50. The inboard actuator device 48 is in mechanical communication with the inboard section 24 and the wing 12 for rotation of the inboard section 24 relative to the wing 12. Preferably, the inboard actuator device 48 is mounted at the forward attachment portion 22 adjacent the inboard attachment portion 18 of the wing 12. The inboard actuator device 48 is configured to apply torque to the inboard section 24 proximate the juncture of the cordwise inboard side 26 and the first tapering edge side 30. Similarly, the outboard actuator device 50 is in mechanical communication with the outboard section 36 and the wing 12 for rotation the outboard section 36 relative to the wing 12. Preferably, the outboard actuator device 50 is mounted at the forward attachment portion 22 adjacent the outboard attachment portion 20 of the wing 12. The outboard actuator device 50 is configured to apply torque to the outboard section 36 proximate the juncture of the cordwise outboard side 38 and the second tapering edge side 42. In an alternate configuration, it is contemplated that the inboard and outboard actuator devices 48, 50 are the same device. The inboard and outboard actuator devices 48, 50 may be configured to rotate the attached inboard and outboard sections 24, 36 are differing speeds with respect to one another.

It is contemplated that the actuator devices 48, 50 may be hydraulic, pneumatic, electromechanical and linear in nature and their sizing and configuration and supporting linkages are chosen from those well known to one of ordinary skill in the art.

The control surface apparatus 16 further has at least one adjustable spanwise member 52 which is hingedly attached to the first and second tapering edge sides 30, 42 of the inboard and outboard sections 24, 36. Preferably, there are provided multiple spanwise members 52. As such, for illustrative purposes, as depicted in FIG. 4, there are provided three spanwise members 52a–c. The spanwise members 52 are movable relative to the wing 12 in response to rotation of the inboard and outboard sections 24, 36. Preferably, the spanwise members 52 are configured substantially parallel to the wing trailing edge 14.

The spanwise members 52 may be generally rod shaped and are substantially rigid structures which maintain their shape during expected operating conditions and loadings. The spanwise members 52 may be formed of materials which are chosen from those which are well known to one of ordinary skill in the art and may include, for example, fiberglass, graphite, steel, and aluminum. The spanwise members 52 are attached to the inboard and outboard sections 24, 36 via those attachment fixtures and methods which are well known to one of ordinary skill in the art. The spanwise members 52 are adjustable in length, and change length in response to deflection of the attached inboard and outboard sections 24, 36. Preferably, the spanwise members 52 are each respectively formed of telescoping segments.

In addition, the control surface apparatus 16 is preferably provided with a flexible wedge section 54. The wedge section 54 is provided with upper and lower control surfaces 56, 58 which taper to a wedge trailing edge portion 60 disposed adjacent the wing trailing edge 14. The adjustable spanwise members 52 are disposed between the upper and lower control surfaces 56, 58, and are in mechanical communication therewith for deflecting the upper and lower control surfaces 56, 58 in response to movement of the spanwise members 52. In this respect, the wedge section 54 is disposed interior to the inboard, outboard and forward attachment portions 18, 20, 22 of the wing 14 and is further interposed between the inboard and outboard section 24, 36. For ease of illustration, the wedge section 54, as depicted in FIG. 4, is shown in an exploded view away from the other subcomponents of the control surface apparatus 16.

The wedge section 54 is provided with spanwise holes 62 which correspond in size, number and configuration to facilitate extension of the spanwise members 52 therethrough. As such, as depicted in FIG. 4, there are provided three spanwise holes 62a–c which respectively correspond to spanwise members 52a–c. The wedge section 54 is provided with wedge inboard and outboard sides 64, 66 which are disposed adjacent the inboard and outboard sections 24, 36 of the present control surface apparatus 16.

The flexible wedge section 54 is formed of an elastomeric material such as silicone rubber, for example. Other suitable materials may be chosen from those which are well known to one of ordinary skill in the art. In order to enhance the structural integrity of the flexible wedge section 54, the wedge section 54 may be provided with reinforcement members 68 disposed in slidable communication therein. The reinforcement members 68 are preferably aligned parallel to the spanwise members 52 so as not interfere with the desired deformation of wedge section 54 in response to movement of the spanwise members 52. The wedge section is further provided with a wedge forward side 70 which is attached to the forward attachment portion 22 of the wing 12 according to those methods which are well known to one of ordinary skill in the art.

The control surface apparatus 16 is preferably provided with a flexible exterior covering 70 disposed about the flexible wedge section 54. The exterior covering has upper and lower portions 72, 74 tapering to a covering trailing edge portion 76. The upper and lower portions 72, 74 are respectively disposed adjacent the upper and lower control surfaces 56, 58 of the flexible wedge section 54 and the covering trailing edge portion 76 is disposed adjacent the wedge trailing edge portion 60. In this respect, the exterior covering 70 deflects and deforms in a conformal manner with deflections of the wedge section 54. The exterior covering 70 is sealably attached to the wing 12 and therefore encloses the other sub-components of the control surface apparatus 16 of the present invention interior to the wing 12. It is contemplated that the flexible exterior covering 70 is attached to the wing 12 according to those methods which are well known to one of ordinary skill in the art. The flexible exterior covering 70 may be formed of an elastomeric material such as thick sheet of silicone rubber, for example. Other suitable materials may be chosen from those which are well known to one of ordinary skill in the art.

Figure 5:
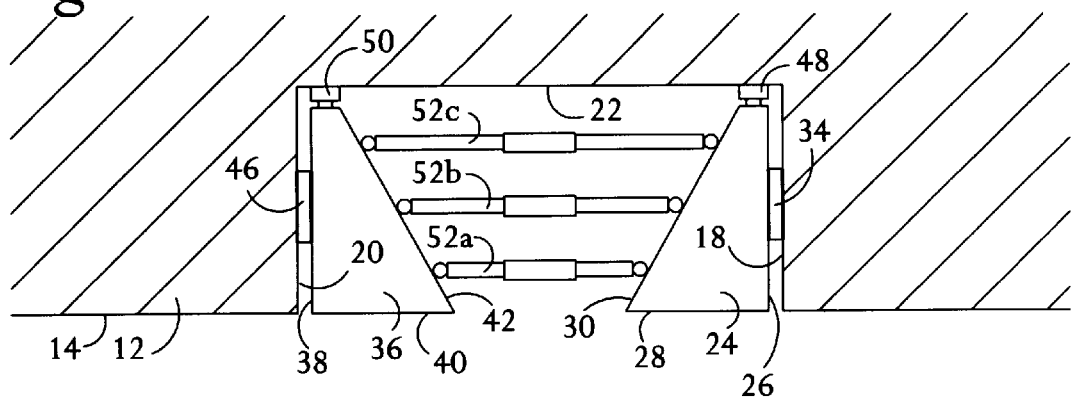
FIG. 5 is a plan view symbolic representation of the control surface apparatus shown in a normal position.
Figure 6:
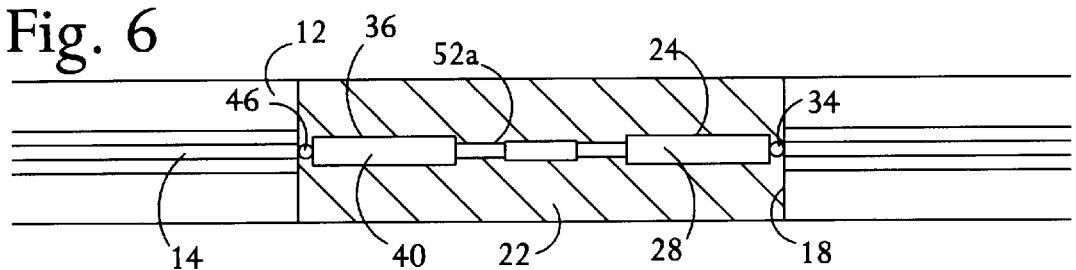
FIG. 6 is the control surface apparatus less the flexible wedge and flexible exterior covering of FIG. 5 as seen from a trailing edge view.

In order to describe the operation of the control surface apparatus 16 constructed in accordance with the present invention, depicted in FIGS. 5–14 are symbolic representations of the inboard and outboard section 24, 36 and spanwise members 54 (the wedge section 54 and exterior covering 70 are not shown). Referring now to FIGS. 5 and 6, there is depicted the control surface apparatus 16 in its normal or undeflected position as seen in plan and trailing edge views.

Figure 7:
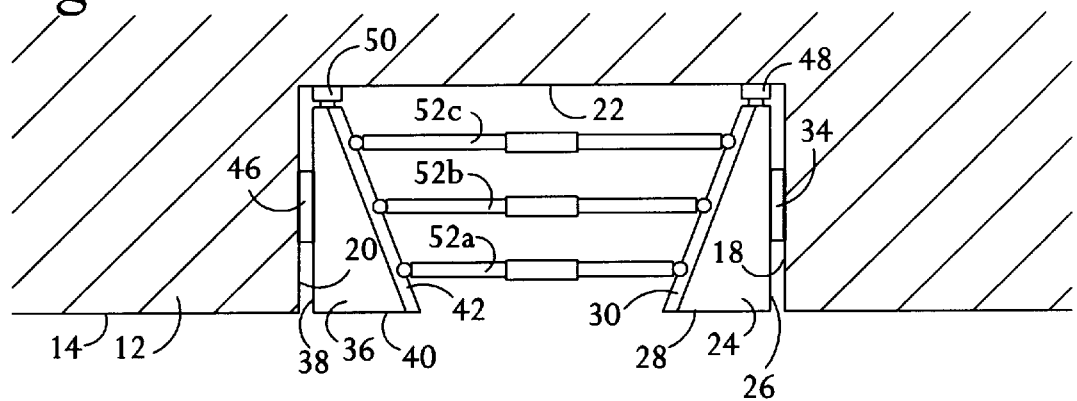
FIG. 7 is the control surface apparatus less the flexible wedge and flexible exterior covering of FIG. 5 shown in a slightly-up position.
Figure 8:
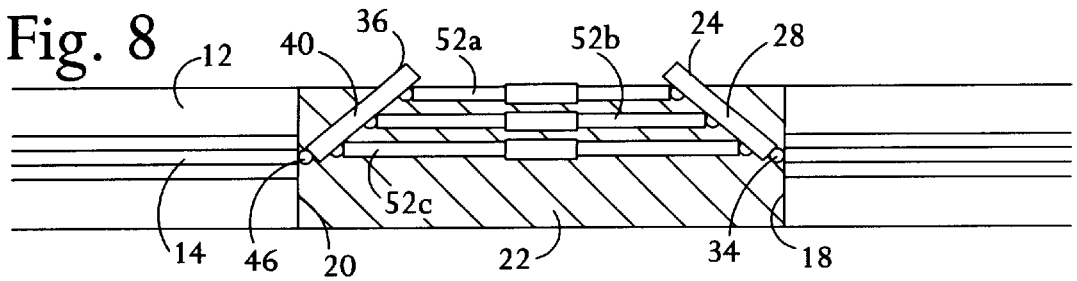
FIG. 8 is the control surface apparatus of FIG. 7 as seen from a trailing edge view.

Referring now to FIGS. 7 and 8 there is depicted the control surface apparatus 16 in a slightly deflected position as seen in plan and trailing edge views. In this respect, the inboard and outboard sections 24, 36 are each respectively rotated by 45° in opposing directions from one another. As can be seen, the spanwise members 52a–c are incrementally vertically displaced from their normal position because of the tapering nature of the first and second tapering edge sides 30, 42. Additionally, the respective lengths of each of the spanwise members 52a–c are extended in response to such rotation of the inboard and outboard sections 24, 36.

Figure 9:
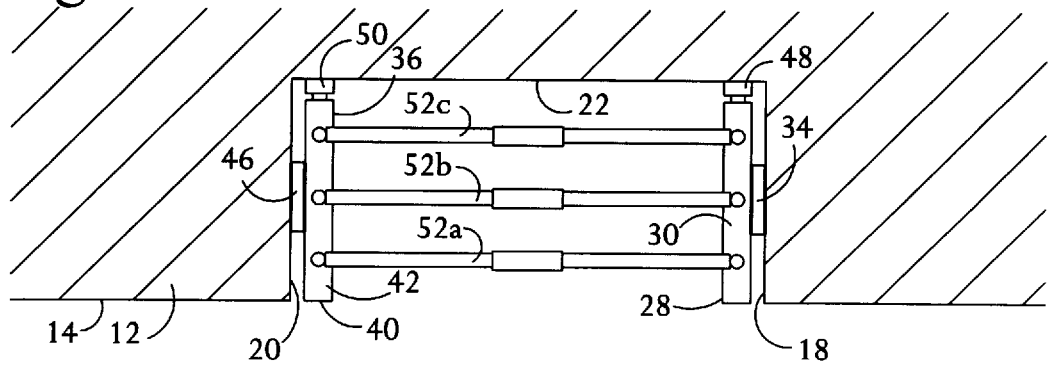
FIG. 9 is the control surface apparatus less the flexible wedge and flexible exterior covering of FIG. 5 shown in a fully-up position.
Figure 10:
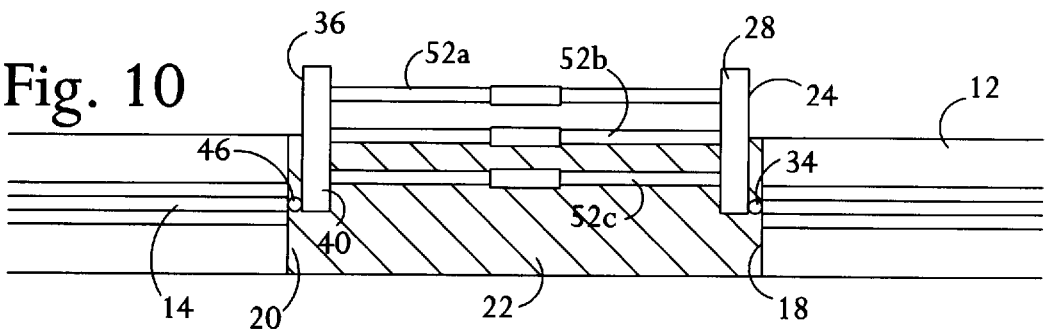
FIG. 10 is the control surface apparatus of FIG. 9 as seen from a trailing edge view.
Figure 11:
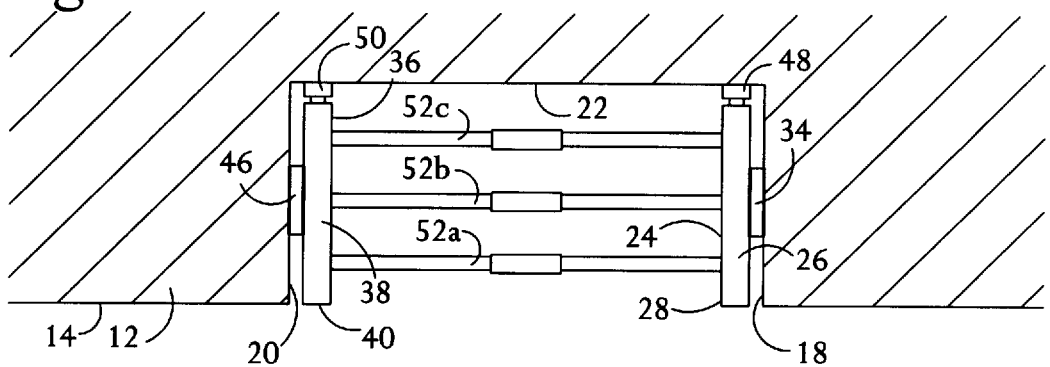
FIG. 11 is the control surface apparatus less the flexible wedge and flexible exterior covering of FIG. 5 shown in a fully-down position.
Figure 12:
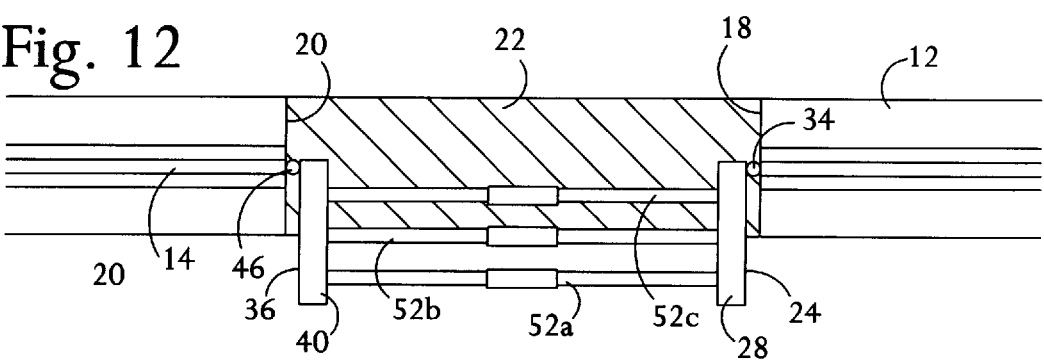
FIG. 12 is the control surface apparatus of FIG. 11 as seen from a trailing edge view.

Referring now to FIGS. 9 and 10, the control surface apparatus 16 is depicted in a fully upwardly deflected position (i.e., flap fully up) as seen in plan and trailing edge views. The inboard and outboard sections 24, 36 are each respectively rotated by 90° in opposing directions from one another with respect to their normal or undeflected positions. The spanwise members 52a–c are displaced in a maximal direction from the wing trailing edge 14. With reference to FIG. 11 and 12, the control surface apparatus 16 is depicted in fully downwardly deflected position (i.e., flap full down) as seen in plan and trailing edge views. Such deflection is achieved by rotating the inboard and outboard sections 24, 36 in the opposite directions from that which is required to deploy the control surface apparatus 16 in an upwardly deflected positions as depicted in FIGS. 7–10.

Thus, the control surface apparatus 16 is upwardly or downwardly deflected by cooperatively rotating the inboard and outboard sections 24, 36 in opposing rotational directions. Such opposing rotational movement causes the spanwise members 52 to translate in an upwardly or downwardly direction relative to the wing 12. As such, the wedge trailing edge portion 60 deflects in a similar upwardly or downwardly direction. In this limited respect, the control surface apparatus 16 of the present invention may provide pitch and roll control to an associated aircraft in a like fashion as that of a conventional flap-type control surface.

Figure 13:
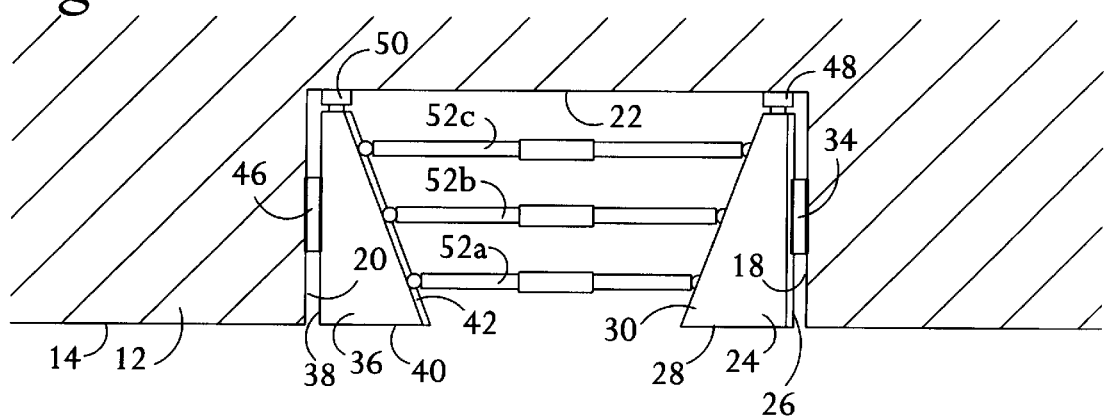
FIG. 13 is the control surface apparatus less the flexible wedge and flexible exterior covering of FIG. 5 shown in a adaptive rotated position.
Figure 14:
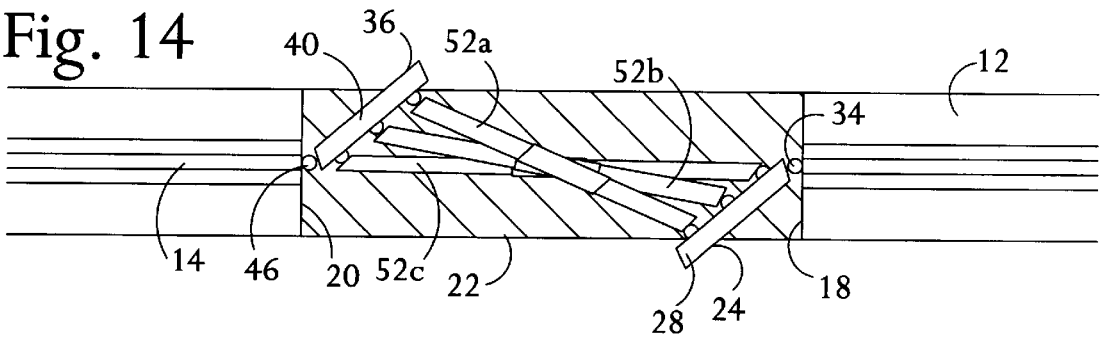
FIG. 14 is the control surface apparatus of FIG. 11 as seen from a trailing edge view.
Figure 15:
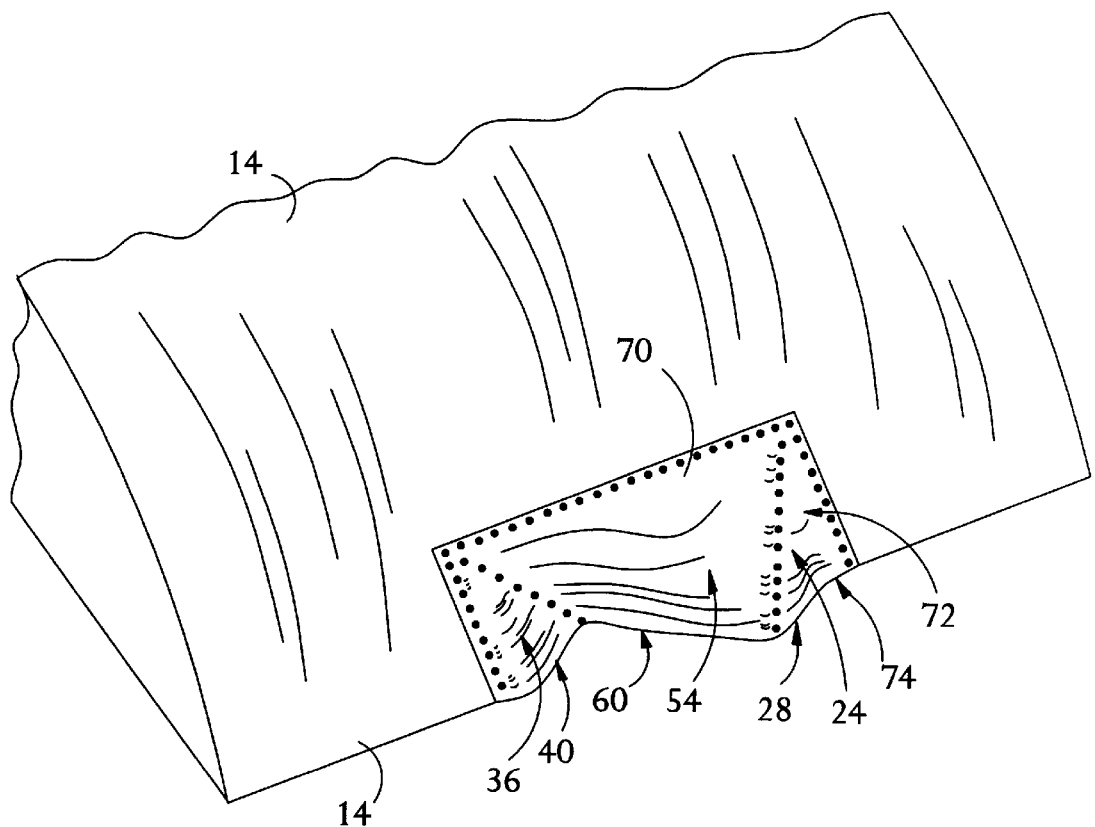
FIG. 15 is a perspective view of the control surface apparatus of FIGS. 13 and 14.

Referring now to FIGS. 13–15, the control surface apparatus 16 is depicted in an adaptive or multi-axis deflected position as respectively seen in plan, trailing edge and perspective views. The inboard and outboard sections 24, 36 are rotated in a similar rotational direction (i.e., counterclockwise as seen from an aft trailing edge view). As can be seen, such rotational movement rotates the spanwise members 52 in a plane generally orthogonal to the cordwise inboard and outboard sides 26, 38 of the inboard and outboard sections 24, 36. As such, the wedge trailing edge portion 60 rotates in a similar manner. As a result, the upper and lower portions 72, 74 of the flexible exterior covering 70 deform and deflect along a complex three-dimensional curvature in a twisting manner. As one of ordinary skill in the art can appreciate, such complex curvature of the upper and lower control surfaces may advantageously facilitate yaw control of the associated aircraft. Thus, the control surface apparatus of the present invention facilitates multi-axis adaptive control.

As mentioned above, actuation of the control surface apparatus 16 of the present invention is effectuated by the application of torque to the inboard and outboard sections 24, 36 generally perpendicular to the spanwise or lateral axis of the wing 14. Thus, the rotational axes 32, 44 of the inboard and outboard sections 24, 36 are generally perpendicular to the rotational axis of an above-described conventional control surface device. As a consequence of such a configuration, unlike a conventional control surface device, the torque or power requirement to actuate the control surface apparatus of the present invention is not directly proportional to the air loads impinging thereon. This is because where control surface apparatus 16 is in a fully deflected position (see FIGS. 9–12) with the inboard and outboard sections 24, 36 rotated approximately 90° to the wing trailing edge 14, the actuator devices 48, 50 are at a maximal mechanical advantage with respect to the impinging air loads. This is because the impinging air load forces are structurally transferred to and through the inboard and outboard sections 24, 36 and result in a moment load proximate actuator devices 48, 50 about an axes which are not the same as the axes of rotation. Thus, the actuator devices 48, 50 are not working directly against the induced air loads. As such, the air load component of the torque required to cause and maintain such maximal deflection is minimal. The torque required to cause and maintain such maximal deflection is primarily associated with deformation resistance forces of the flexible wedge section 54 and flexible exterior covering 70.

As best depicted in the plan views of FIGS. 5, 7, 9 and 11, the trailing edgemost portions of the control surface apparatus 16 (i.e., the first and second trailing edge sides 28, 40 of the inboard and outboard sections 24, 36, the wedge trailing edge portion 60, and the trailing edge portion 76 of the flexible exterior covering 70) do not translate in the cordwise direction during any mode of actuation or deflection. This is unlike any of those conventional flap type control surface devices whose cord length is undesirably reduced during deflection.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. An aerodynamic control surface apparatus for use with a wing assembly having a wing trailing edge, the control surface apparatus comprising:

an inboard section defined by a cordwise inboard side, a first trailing edge side, and a first tapering edge side disposed between the inboard and the first trailing edge sides, the inboard section having an axis of rotation generally about the cordwise inboard side;

an outboard section defined by a cordwise outboard side, a second trailing edge side, and a second tapering edge side disposed between the outboard and the second trailing edge sides, the outboard section having an axis of rotation generally about the cordwise outboard side; and at least one adjustable spanwise member hingedly attached to the first and second tapering edge sides of the inboard and outboard sections, the spanwise member moving relative to the wing assembly in response to rotation of the inboard and outboard sections.

2. The control surface apparatus of claim 1 wherein the inboard and outboard sections are generally triangular shaped.

3. The control surface apparatus of claim 1 wherein the at least one adjustable spanwise member is substantially parallel to the wing trailing edge.

4. The control surface apparatus of claim 1 wherein the cordwise inboard side of the inboard section and the cordwise outboard side of the outboard section are hingedly attachable to the wing assembly.

5. The control surface apparatus of claim 1 wherein the inboard and outboard sections are rotatable in a similar direction.

6. The control surface apparatus of claim 1 wherein the inboard and outboard sections are rotatable in an opposing direction.

7. The control surface apparatus of claim 1 further comprises:

an inboard actuator device in mechanical communication with the inboard section and the wing assembly for rotation the inboard section relative to the wing assembly; and an outboard actuator device in mechanical communication with the outboard section and the wing assembly for rotation the outboard section relative to the wing assembly.

8. The control surface apparatus of claim 1 wherein the at least one adjustable spanwise member is formed of multiple telescoping segments.

9. The control surface apparatus of claim 1 further comprises:

a flexible wedge section having upper and lower control surfaces tapering to a wedge trailing edge portion disposed adjacent the wing trailing edge, the at least one adjustable spanwise member being disposed between the upper and lower control surfaces and in mechanical communication therewith for deflecting the upper and lower control surfaces in response to movement of the spanwise member.

10. The control surface apparatus of claim 9 wherein the flexible wedge section is formed of an elastomeric material.

11. The control surface apparatus of claim 10 wherein the elastomeric material comprises silicone rubber.

12. The control surface apparatus of claim 9 wherein the flexible wedge section having structural reinforcement members disposed therein.

13. The control surface apparatus of claim 12 wherein the structural reinforcement members are in slidable communication with the flexible wedge section.

14. The control surface apparatus of claim 12 wherein the structural reinforcement members are aligned substantially with the at least one adjustable spanwise member.

15. The control surface apparatus of claim 9 further comprising a flexible exterior covering disposed about the flexible wedge section, the exterior covering having upper and lower portions tapering to a covering trailing edge portion, the upper and lower portions being respectively disposed adjacent the upper and lower control surfaces of the flexible wedge section, the covering trailing edge portion being disposed adjacent the wedge trailing edge portion.

16. The control surface apparatus of claim 15 wherein the flexible exterior covering is attachable to the wing assembly.

17. The control surface apparatus of claim 16 wherein the flexible exterior covering is sealably attachable to the wing assembly.

18. The control surface apparatus of claim 15 wherein the flexible exterior covering section is formed of an elastomeric material.

19. The control surface apparatus of claim 18 wherein the elastomeric material comprises silicone rubber.

* * * * *